Thomas & Mast.
Fertilizing.
№ 93,368.   Patented Aug. 3, 1869.
Fig: 1.
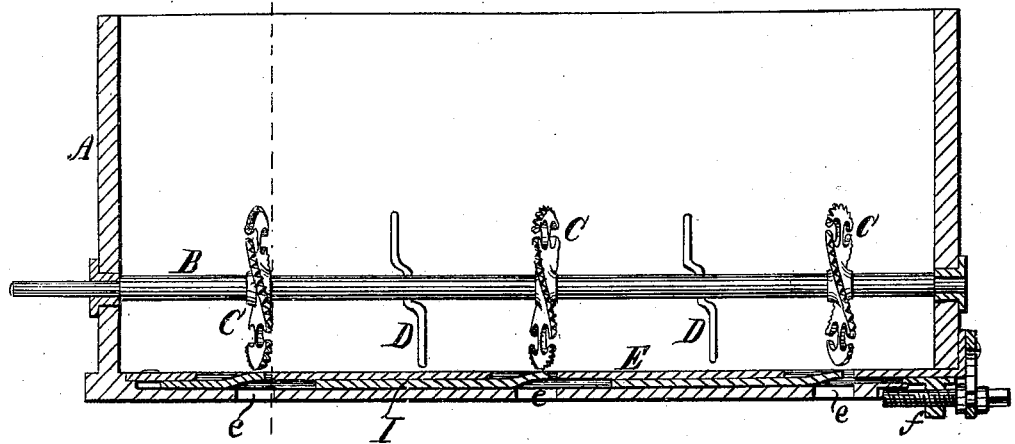
Fig: 2.
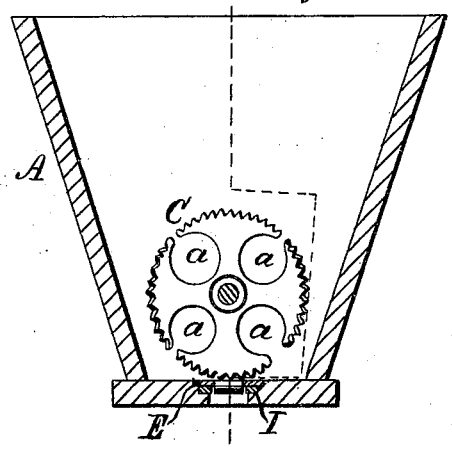
Witnesses:
L. Hailer.
P. T. Dodge
Inventors:
J. W. Thomas &
P. P. Mast
by Dodge & Munn
their attys.

United States Patent Office.

JOHN H. THOMAS AND PHINEAS P. MAST, OF SPRINGFIELD, OHIO.

Letters Patent No. 93,368, dated August 3, 1869.

IMPROVEMENT IN MACHINE FOR DISTRIBUTING FERTILIZERS.

The Schedule referred to in these Letters Patent and making part of the same.

*To all whom it may concern:*

Be it known that we, JOHN H. THOMAS and PHINEAS P. MAST, of Springfield, Clark county, Ohio, have invented certain new and useful Improvements in Machines for Distributing Fertilizers; and we do hereby declare that the following is a full, clear, and exact description thereof, reference being had to the accompanying drawings, making part of this specification, and to the letters of reference marked thereon, like letters indicating like parts.

Our invention relates to that class of machines used for distributing fertilizers, such as guano, plaster, phosphates, &c.; and The invention consists in a new and improved device for stirring up and feeding out the fertilizer, as hereinafter explained.

Figure 1 is a longitudinal view of a hopper, with our improved distributing-apparatus applied.

Figure 2 is a cross-section on the line y-y of fig. 1.

In constructing machines for distributing fertilizers, the principal difficulty has been to devise some apparatus that would keep it stirred up loose in the hopper, prevent it from clogging or packing, and feeding it out evenly.

After various trials, we have devised an apparatus for this purpose, which, on trial, we find to work perfectly.

A represents the hopper, which is made in the usual manner, and may be mounted on a suitable frame on wheels by itself, or it may be mounted on a grain-drill, and used in connection therewith, this latter being the more general method of using this class of machines.

The hopper is provided with a slide, I, which is adjusted by a screw, *f*, at one end, as shown in fig. 1, by which the openings *e*, in the hopper-bottom, through which the fertilizer is fed, may be closed more or less, as desired.

Lengthwise of the hopper A, and in the centre thereof, is arranged a shaft, B, one end of which projects out through the end of the hopper, to receive a pinion, by which motion is imparted to the shaft from the driving-mechanism.

On this shaft B, over each opening in the hopper-bottom, we secure a circular metallic plate, C, of peculiar form, as represented in the drawings. This plate, instead of being flat or straight on its sides, is curved or bent, as represented in fig. 1.

It will be observed that the twisted or bent form of these plates is such, that as they revolve, their periphery gradually moves to and fro, sidewise over the holes *e*, and thereby shoves the material back and forth, across the holes, and thus works or feeds it through them. At the same time the mass of the material in the hopper is kept thoroughly loosened or stirred up, and prevented from becoming clogged or packed therein.

These plates or stirrers are formed with openings *a* in them, as shown in fig. 2, which not only make them lighter, but also permit the material to work through, more or less, and thereby assist to keep it free and loose.

Their peripheries are notched or serrated, as shown in figs. 1 and 2, for the purpose of preventing the material, especially when guano is used, from being packed down under them, as was the case when their edges were left smooth, as we found by our experiments.

Between these plates C, arms or rods D may be attached to the shaft B, as represented in fig. 1, to assist in stirring up and keeping the material loose.

It is obvious that by placing the hopper upon a grain-drill, or by providing a separate hopper on the drill, and fitting in it this apparatus, the fertilizer may be distributed at the same time with the grain, and that by attaching to the hopper-bottom suitable spouts, the fertilizer may be conveyed into the drill-tube, and deposited along with the grain, all at one operation.

Having thus described our invention,

What we claim, is—

1. The stirrers or plates C, having their periphery serrated, and otherwise constructed substantially as described.

2. The shaft B, having the plates C and arms or rods D attached, and all arranged to rotate within a hopper, substantially as and for the purpose set forth.

JOHN H. THOMAS.
PHINEAS P. MAST.

Witnesses:
H. S. SHOWERS,
J. W. THOMAS.